United States Patent [19]
Bosquain et al.

[11] Patent Number: 5,882,385
[45] Date of Patent: *Mar. 16, 1999

[54] PLANT FOR TREATING AT LEAST ONE FLUID AND USE FOR THE SEPARATION OF AT LEAST ONE CONSTITUENT OF A GAS MIXTURE

[75] Inventors: Maurice Bosquain, Sommecaise; Jean-Yves Lehman, Maisons-Alfort, both of France

[73] Assignee: L'Air Liquide, Societe Anonyme Pour L'Etude et L'Exploitation des Procedes Georges Claude, Paris Cedex, France

[*] Notice: This patent issued on a continued prosecution application filed under 37 CFR 1.53(d), and is subject to the twenty year patent term provisions of 35 U.S.C. 154(a)(2).

[21] Appl. No.: 756,558

[22] Filed: Nov. 26, 1996

[30] Foreign Application Priority Data

Dec. 5, 1995 [FR] France .................................... 95 14335

[51] Int. Cl.$^6$ ................................................. B01D 53/04
[52] U.S. Cl. ................................ 96/138; 55/322; 55/325; 55/517; 55/518; 96/139; 96/151; 96/152
[58] Field of Search .............................. 55/320, 321, 322, 55/325, 512, 518, 517; 95/90, 268, 274; 96/138, 139, 151, 152

[56] References Cited

U.S. PATENT DOCUMENTS

| | | | |
|---|---|---|---|
| 1,934,968 | 11/1933 | Connolly . | |
| 2,112,335 | 3/1938 | Drennan | 55/518 |
| 2,127,561 | 8/1938 | Herrmann . | |
| 3,410,055 | 11/1968 | Zenz | 55/517 |
| 3,566,867 | 3/1971 | Dryden | 55/512 |
| 3,835,627 | 9/1974 | Dryden | 96/151 |
| 3,926,587 | 12/1975 | Squires | 55/517 |
| 3,950,139 | 4/1976 | Cannon . | |
| 3,960,520 | 6/1976 | Allen . | |
| 4,033,727 | 7/1977 | Vautrain . | |
| 4,121,916 | 10/1978 | Fricke | 55/518 |
| 4,193,383 | 3/1980 | Rogers | 96/139 |
| 4,670,226 | 6/1987 | Furuyama et al. | 55/518 |
| 5,348,573 | 9/1994 | Tomassian et al. | 96/152 |
| 5,514,205 | 5/1996 | Awaji | 96/139 |

FOREIGN PATENT DOCUMENTS

| | | | |
|---|---|---|---|
| 0 636 399 | 2/1995 | European Pat. Off. . | |
| 34 09 140 A1 | 10/1985 | Germany | 96/139 |
| 40 30 677 A1 | 5/1992 | Germany | 96/139 |
| 52-54682 | 5/1977 | Japan | 96/152 |
| 7-116450 | 5/1995 | Japan . | |
| 1225605 A | 4/1986 | U.S.S.R. | 96/152 |
| 1662642 A | 7/1991 | U.S.S.R. | 96/152 |
| 1 204 634 | 9/1970 | United Kingdom . | |
| 1 309 427 | 3/1973 | United Kingdom . | |

*Primary Examiner*—C. Scott Bushey
*Attorney, Agent, or Firm*—Young & Thompson

[57] ABSTRACT

An apparatus for improving the flow of fluid to be treated in boundary regions of a mass (2) of particulate material. The apparatus has at least one deflecting surface (4), making an angle with the main direction of the flow of fluid passing through the mass, in the boundary region in order to divert the flow of the fluid locally. The apparatus may be used in plants for purifying or separating gas mixtures.

11 Claims, 2 Drawing Sheets

PLANT FOR TREATING AT LEAST ONE FLUID AND USE FOR THE SEPARATION OF AT LEAST ONE CONSTITUENT OF A GAS MIXTURE

FIELD OF THE INVENTION

The present invention relates to plants for treating at least one fluid, of the type comprising at least one mass of particulate material through which the fluid flows in a main direction.

BACKGROUND OF THE INVENTION

Plants of this type find many applications in the technical field, using particulate materials such as catalysts and/or adsorbents. In most of these applications, achieving the optimum performance depends on good control of the flows of the fluid through the mass of adsorbent.

SUMMARY OF THE INVENTION

The object of the present invention is to propose an improved fluid treatment plant that simply, inexpensively and effectively channels the fluid flow lines in boundary regions of the mass of particulate material without disorganizing this mass or its arrangement in a container.

To do this, according to one characteristic of the invention, the plant includes, in the vicinity of at least one boundary region of the mass of particulate material, at least one deflecting surface extending so as to project into the mass from a wall bounding the mass, the deflecting surface making an angle with the main direction in order locally to divert the flow of the fluid in the mass and making with a horizontal plane an angle (a) greater than the angle of repose of the particulate material.

A further object of the present invention is the use of a plant as above for the separation of at least one constituent of a gas mixture, for example the drying or purification of a gas and/or the separation of at least one constituent of a gas mixture, for example the purification of a flow of air to be distilled or the production of oxygen and/or nitrogen from a flow of air.

BRIEF DESCRIPTION OF THE DRAWINGS

Further characteristics and advantages of the present invention will emerge from the following description of embodiments, given by way of illustration but in no way implying limitation, in conjunction with the appended drawings in which.

DESCRIPTION OF THE PREFERRED EMBODIMENTS

Figure 1:
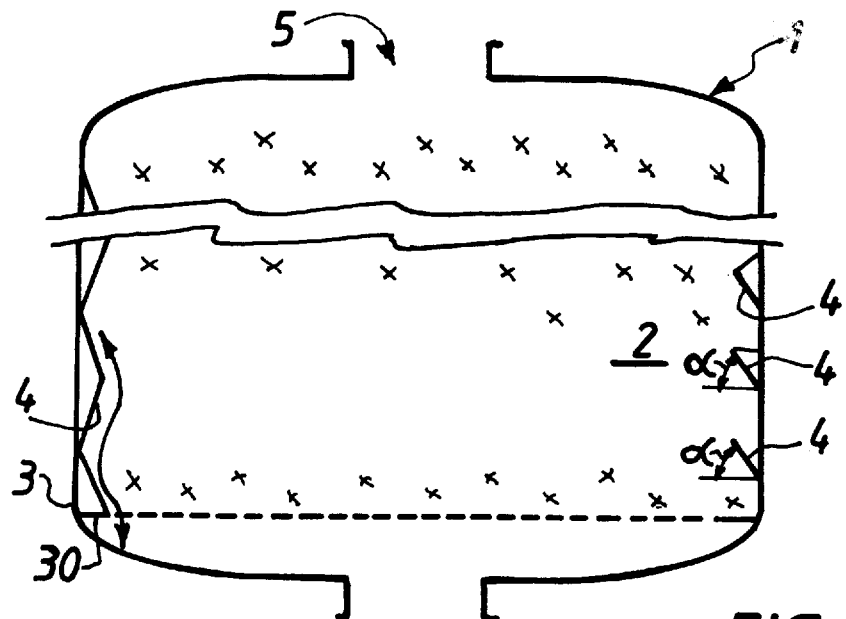
FIG. 1 is a diagrammatic sectional view of a first embodiment of a plant according to the invention in which the fluid flows vertically.

FIG. 1 shows the outline of a vertical container 1, typically one which is axisymmetric, containing at least one mass 2 of particulate material, for example an adsorbent, for the purification or separation of a gas mixture, resting on a perforated bottom partition. According to the invention, in order to cause local lengthening of the path travelled by the fluid along the walls of the peripheral shell 3 of the container 1, and to force the fluid to encounter a larger number of particles of material at this point, deflecting surfaces 4 are attached to the shell 3 at regular intervals, these deflecting surfaces extending over a short distance upwards and inwards into the container and making an angle a with the horizontal greater than the angle of repose of the particulate material poured onto a receiving support, thus avoiding the formation of a cavity with a free slope in the particulate material under the said surface. The deflecting surface may be finished with a baffle in order to form, as shown at the top right and top left in FIG. 1, V-shaped deflecting elements which may or may not be symmetrical and may or may not be contiguous. In such an arrangement, it will be understood that the fluid will be obliged to follow an undulating path, as depicted in the left-hand part of FIG. 1, along the vertical edges of the mass 2, thereby lengthening its path in a region where particulate-material bypass channels are conventionally found, yet the deflecting surfaces 4 do not prevent uniform filling of the container 1 when the particulate material is poured via the upper charging orifice 5 of the container 1.

Figure 2:
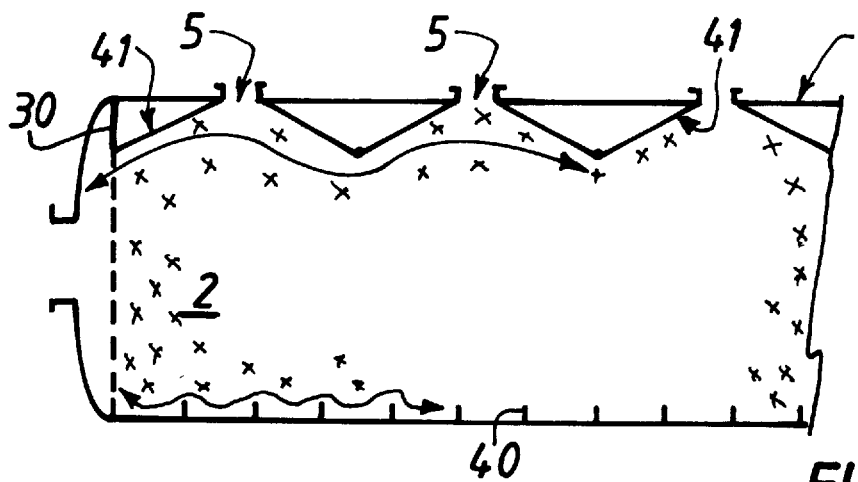
FIG. 2 is a partial diagrammatic sectional view of a second embodiment of a plant according to the invention, in which the fluid flows horizontally.

FIG. 2 shows a container 1 having a horizontal arrangement, the mass 2 of particulate material resting on a horizontal bottom arranged in the container 1, the particulate material being poured into the latter via charging orifices 5 distributed along the upper surface of the container 1. According to the invention, in addition to the deflectors 4 (not shown) on the side walls of the container 1, the latter comprises vertical transverse deflectors 40 which consist, for example, of single flat rings or bars arranged at regular intervals along the bottom wall of the container, and the upper charging orifices 5 are provided with distributing hoods 41 in the form of truncated pyramids with contiguous bases. As depicted by the arrows in FIG. 2, the arrangement according to the invention forces the fluid to follow a sinuous path along both the top and bottom, avoiding bypasses at the gravity-fed charging regions. It will be noted in FIGS. 1 and 2 that there is a transverse baffle 30 at the point where the flow enters/leaves the mass 2 in order to encourage the flow downstream to diverge locally here and therefore to slow down locally near the wall.

Figure 3:
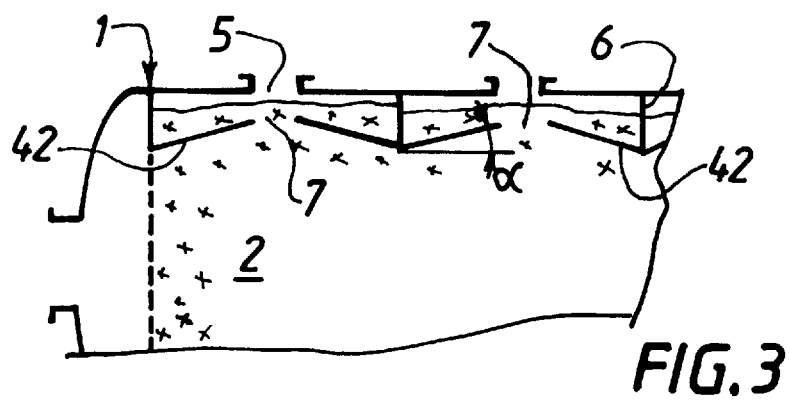
FIG. 3 is a partial sectional view similar to that in FIG. 2, showing an alternative embodiment.

FIG. 3 shows an alternative embodiment of the horizontal arrangement in FIG. 2. Here, the upper deflectors consist of pairs of plates 42 which converge towards each other, towards the orifices 5, from suspension partitions 6, but which leave a charging slot or opening 7 opposite each orifice 5, thus allowing easy filling of the container, which is continued until the plates 42 are buried in a top reserve of particulate material, enabling in particular any compaction of the material that may occur in the active part of the container to be relieved. The plates 42 make, as previously, an angle α with respect to the horizontal greater than the angle of repose of the particulate material used, conventionally lying between 20 and 30 degrees.

Figure 4:
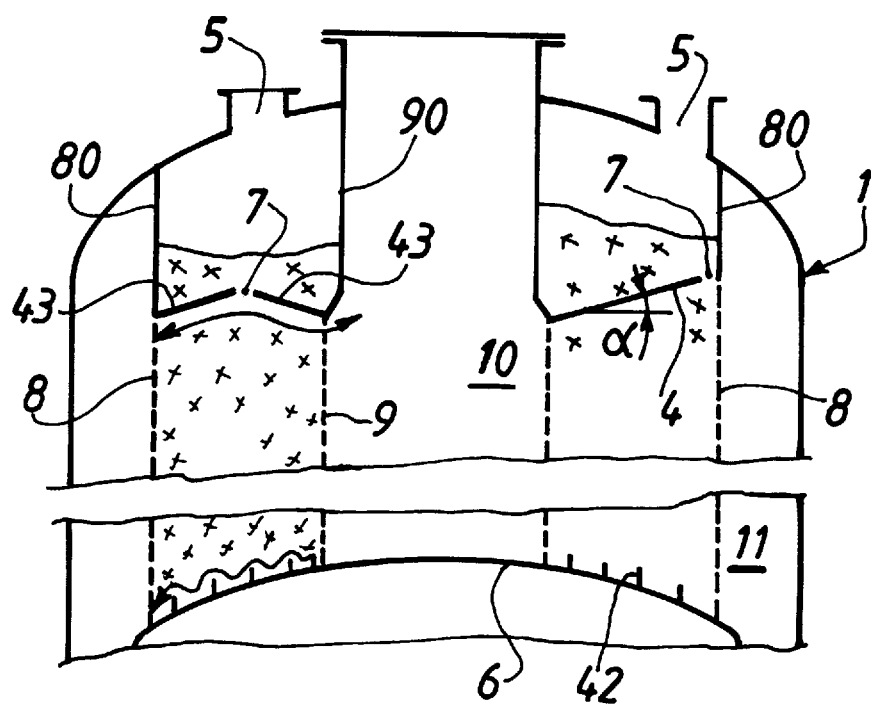
FIG. 4 is a vertical sectional view of a third embodiment of a plant according to the invention with an annular bed of particulate material.

FIG. 4 shows a vertical container 1 which contains at least one annular mass 2 of particulate material retained between two concentric perforated walls 8 and 9 which bound, inside the container 1, inner 10 and outer 11 chambers between which the fluid flows by passing through the mass 2 radially. According to the invention, in addition to the vertical deflectors 42, which in this case are annular, on the bottom, which in this case is domed, supporting the mass 2, the container includes, as shown in the left-hand part of FIG. 4, two annular deflecting surfaces 43 which extend towards each other from the junction regions between, respectively, the grills 8, 9 and the shells 80, 90 from which the latter are suspended and which have, as in the embodiment in FIG. 3, a vertical V-shaped cross-section leaving, at their apex, an annular passage 7 lying substantially vertically below the charging orifices 5 and enabling the space between the grills 8 and 9 to be charged with particulate material via these orifices, the charging being carried out, here too, until the deflecting plates 81 and 91 are well buried, as shown in the figure. As depicted in the latter by the upper arrow, the deflecting surfaces 43 force the fluid at the upper end of the grills 8 and 9 to flow almost directly from the space 10 to the space 11, or vice versa, without leaking away through the reserve of particular material between the shells 80 and 90.

In a variant, as shown in the right-hand part of FIG. 4, it is possible to use only one frustoconical annular deflecting plate 4, the annular passage 7 then being defined between the end of the plate and the now shortened suspension shell (80) opposite.

Although the present invention has been described in relation to particular embodiments, it is not limited thereby but is, on the contrary, susceptible of modifications and variants which will be apparent to one skilled in the art.

We claim:

1. An apparatus for treating at least one fluid, comprising:
    a container having an upper wall, a bottom wall and containing at least one mass of particulate material having an upper boundary region;
    means for causing the fluid to circulate substantially horizontally through the mass;
    a plurality of serially arranged fluid deflecting surfaces in a horizontal fluid-flow path in the vicinity of an upper boundary region of the mass,
    said deflecting surfaces extending from the upper wall so as to project into the mass, and deflect locally the flow of fluid circulating through the mass, said deflecting surfaces making with the horizontal, an angle greater than the angle of repose of the particulate material; and
    at least two deflecting surfaces forming legs of a paired assembly having a shape of an inverted V and defining at an apex thereof and between said legs a filling passage for the particulate material.

2. The apparatus of claim 1, wherein the paired assembly of deflecting surfaces is buried in the mass.

3. The apparatus of claim 1, wherein the container has a main horizontal direction and includes at least two paired assemblies.

4. The apparatus of claim 1, wherein the particulate material includes at least one adsorbent material.

5. An apparatus for treating at least one fluid comprising:
    a container having an upper end and containing at least one annular mass of particulate material having an upper boundary region and retained between two concentric perforated walls
    means in said upper end for filling the mass into the container
    means for causing the fluid to circulate substantially horizontally through the annular mass, and
    at least one fluid flow deflecting surface projecting from one of said perforated walls into the mass in the vicinity of the upper boundary region thereof to deflect locally the flow of fluid circulating through the mass, said deflecting surface making with the horizontal an angle greater than the angle of repose of the particulate material.

6. The apparatus of claim 5, comprising a pair of said deflecting surfaces, each projecting from a said perforated wall.

7. The apparatus of claim 6, wherein the deflecting surfaces of said pair project one towards each other, forming an inverted V having at an apex thereof a filling passage for the particulate material.

8. The apparatus of claim 5, wherein said deflecting surface is made of at least one frusto-conical plate.

9. The apparatus of claim 5, wherein the container is cylindrical, concentric to the perforated walls.

10. The apparatus of claim 5, wherein the container comprises a bottom wall supporting the annular mass and deflectors extending vertically into the annular mass.

11. The apparatus of claim 5, wherein the particulate material includes at least one adsorbent material.

\* \* \* \* \*